United States Patent [19]
Tamura et al.

[11] Patent Number: 6,101,998
[45] Date of Patent: Aug. 15, 2000

[54] CONTROL APPARATUS FOR AN IN-CYLINDER INJECTION SPARK-IGNITION INTERNAL COMBUSTION ENGINE

[75] Inventors: Hiroki Tamura; Kazuchika Tashima, both of Tokyo, Japan

[73] Assignee: Mitsubishi Jidosha Kogyo Kabushiki Kaisha, Tokyo, Japan

[21] Appl. No.: 09/051,169

[22] PCT Filed: Aug. 5, 1997

[86] PCT No.: PCT/JP97/02718

§ 371 Date: Apr. 3, 1998

§ 102(e) Date: Apr. 3, 1998

[87] PCT Pub. No.: WO98/05856

PCT Pub. Date: Feb. 12, 1998

[30] Foreign Application Priority Data

Aug. 5, 1996 [JP] Japan ................................. 8-206014

[51] Int. Cl.[7] ........................................... F02B 17/00
[52] U.S. Cl. ................................... 123/295; 123/305
[58] Field of Search .............................. 123/295, 305, 123/406.47

[56] References Cited

U.S. PATENT DOCUMENTS

| | | | |
|---|---|---|---|
| 5,313,920 | 5/1994 | Matsushita | 123/295 |
| 5,870,992 | 2/1999 | Kamura et al. | 123/305 |
| 5,873,344 | 2/1999 | Kudou et al. | 123/295 |
| 5,875,756 | 3/1999 | Kamura et al. | 123/305 |
| 5,878,711 | 3/1999 | Kamura et al. | 123/295 |

FOREIGN PATENT DOCUMENTS

| | | |
|---|---|---|
| 47-35429 | 11/1972 | Japan . |
| 60-36719 | 2/1985 | Japan . |
| 60-125748 | 7/1985 | Japan . |
| 63-138118 | 6/1988 | Japan . |
| 63-202770 U | 12/1988 | Japan . |
| 1125538 | 5/1989 | Japan . |
| 5113146 | 5/1993 | Japan . |
| 8602542 | 11/1993 | Japan . |
| 6101554 | 4/1994 | Japan . |
| 7133735 | 5/1995 | Japan . |
| 7269402 | 10/1995 | Japan . |

*Primary Examiner*—John Kwon

[57] ABSTRACT

In a control apparatus for an in-cylinder injection spark-ignition internal combustion engine, which has a fuel injection valve (4) for injecting a fuel directly into a combustion chamber (5), and in which the fuel is injected mainly in a compression stroke, thereby undergoing stratified-charge combustion, when the internal combustion engine is operated in a specified operation region, a target load value Pe set corresponding to accelerator opening information based at least on a driver's operation is corrected with detected environmental parameter values correlated with an intake air density, engine control parameter values Tend and Tig are set in accordance with the corrected target load value Pec, and stratified-charge combustion is executed in accordance with the set engine control parameter values. Thus, the stratified-charge combustion can be carried out steadily and securely even if environmental parameter values, such as the atmospheric pressure, intake air temperature, etc., that are correlated with the intake air density are substantially different from those for the standard atmosphere during engine operation in an upland or the like.

14 Claims, 12 Drawing Sheets

FIG. 11

| Ne<br>θ th | N₁ | N₂ | • • • • | $N_{j-1}$ | $N_j$ |
|---|---|---|---|---|---|
| $θ_1$ | $P_{eB11}$ | $P_{eB12}$ | • • • • | $P_{eB1j-1}$ | $P_{eB1j}$ |
| $θ_1$ | $P_{eB21}$ | $P_{eB22}$ | • • • • | $P_{eB2j-1}$ | $P_{eB2j}$ |
| ⋮ | ⋮ | ⋮ | • • • • | ⋮ | ⋮ |
| $θ_{i-1}$ | $P_{eBi-11}$ | $P_{eBi-12}$ | • • • • | $P_{eBi-1j-1}$ | $P_{eBi-1j}$ |
| $θ_i$ | $P_{eBi1}$ | $P_{eBi2}$ | • • • • | $P_{eBij-1}$ | $P_{eBij}$ |

CONTROL APPARATUS FOR AN IN-CYLINDER INJECTION SPARK-IGNITION INTERNAL COMBUSTION ENGINE

This application is the national phase under 35 U.S.C. §371 of prior PCT International Application No., PCT/JP97/02718, which has an International filing date of Aug. 5, 1997, which designated the United States of America, the entire contents of which are hereby incorporated by reference.

TECHNICAL FIELD

The present invention relates to a control apparatus for controlling outputs of an in-cylinder injection spark-ignition internal combustion engine mounted on a vehicle.

BACKGROUND ART

In order to reduce harmful gas components discharged from spark-ignition internal combustion engines that are mounted on vehicles, or improve fuel-efficiency of the engines, various gasoline engines of an in-cylinder injection type, in which fuel is injected directly into a combustion chamber, have recent been proposed in place of conventional manifold-injection engines.

In an in-cylinder injection gasoline engine, an air-fuel mixture with an air-fuel ratio near a stoichiometric air-fuel ratio is generated around a spark plug at the time of ignition by, for example, injecting fuel from a fuel injection valve into a cavity formed in the top portion of a piston. Thus, the fuel can be ignited with use of a generally lean air-fuel ratio, so that the deliveries of CO and HC are reduced, and the fuel-efficiency during idle operation or low-load drive operation can be improved considerably.

In the gasoline engine of this type, moreover, the injection mode is switched between a compression-stroke injection mode and an intake-stroke injection mode, depending on the operating state of the engine, that is, engine loads. When the engine is in low-load operation, the fuel can be injected mainly during a compression stroke so that an air-fuel mixture with an air-fuel ratio near the stoichiometric air-fuel ratio can be locally formed around the spark plug or in the cavity. Thus, the fuel can be ignited satisfactorily even with use of a lean overall air-fuel ratio. When the engine is in medium- or high-load operation, on the other hand, the fuel can be injected during an intake stroke so that an air-fuel mixture with a uniform air-fuel ratio can be formed in the combustion chamber. As in the case of a manifold-injection gasoline engine, therefore, the fuel can be burned to secure a required output for acceleration or high-speed drive.

In a conventional manifold-injection gasoline engine, the inflammable air-fuel ratio region (lean burn region) of an air-fuel mixture supplied to the engine is so narrow that a substantially constant output torque can be obtained within the inflammable air-fuel ratio region if a volumetric efficiency Ev is fixed. Thus, the volumetric efficiency Ev and the output torque are substantially in unique relation. In the conventional manifold-injection gasoline engine having this property, engine control parameter values, such as a target air-fuel ratio, target ignition timing, etc., are set by using the volumetric efficiency Ev that is obtained from an airflow sensor output, and the operation of the engine is controlled in accordance with these control parameter values.

In the control of the in-cylinder injection gasoline engine in the compression-stroke injection mode, however, the fuel is injected into the cavity in the top portion of the piston to effect the stratified-charge lean combustion as a whole. Accordingly, normal combustion can be achieved if an inflammable air-fuel mixture exists only around the spark plug. When compared with the manifold-injection gasoline engine, therefore, this engine enjoys a much wider inflammable air-fuel ratio range in terms of the overall air-fuel ratio. Thus, in the control of the in-cylinder injection gasoline engine in the compression-stroke injection mode, operation can be carried out in a wider air-fuel ratio range from a very lean air-fuel ratio (e.g., air-fuel ratio of 50) to a rich inflammable-limit air-fuel ratio (e.g., air-fuel ratio of 20). Although the value of the volumetric efficiency is fixed, therefore, the output torque varies considerably as the target air-fuel ratio is changed, so that the output torque can be obtained substantially in proportion to the quantity of fuel supply. This implies that it is difficult to use the aforesaid volumetric efficiency Ev to set the engine control parameter values, such as the target air-fuel ratio and the target ignition timing, in the compression-stroke injection mode of the in-cylinder injection gasoline engine.

In consideration of these circumstances, the inventor hereof has proposed to use an in-cylinder effective pressure Pe in place of the volumetric efficiency Ev, as a parameter representative of the engine output, in setting the engine control parameter values, such as the target air-fuel ratio and the target ignition timing, in the compression-stroke injection mode of the in-cylinder injection gasoline engine, or in discriminating mode change between the compression-stroke injection mode and the intake-stroke injection mode. More specifically, the target in-cylinder effective pressure (target load value) Pe correlated with a driver's desired engine output is obtained from an accelerator opening (throttle opening) and engine speed (rotational speed), and the fuel supply quantity (target air-fuel ratio), ignition timing, etc. are set in accordance with this target value Pe.

DISCLOSURE OF THE INVENTION

In the compression-stroke injection mode of the in-cylinder injection gasoline engine, there is an intimate relation between the fuel injection timing and the ignition timing for obtaining stable stratified-charge combustion in a cylinder, and these engine control parameter values must be set at optimal values. FIG. 1 shows regions that ensure stable combustion based on the injection timing (injection termination timing) and the ignition timing with an intake air pressure used as a parameter (air-fuel ratio fixed at 30). A stable combustion region indicated by full line in FIG. 1 is obtained as a result of an experiment under the standard atmospheric pressure, and implies that the ignition timing must be substantially retarded correspondingly if the injection timing is retarded. In consideration of differences between individual engines, the injection timing and ignition timing, indicated by point A in the drawing, are individual optimal timings under the standard atmospheric pressure condition. Accordingly, an optimal injection timing and an optimal ignition timing obtained for each target air-fuel ratio are experimentally obtained in advance, and based on these values, a target air-fuel ratio, target injection timing, target ignition timing, target EGR amount (exhaust reflux amount), etc. are set in accordance with the target in-cylinder effective pressure Pe.

Under intake air pressures P1 and P2 (P0>P1>P2) lower than a standard atmospheric pressure P0, as shown in FIG. 1, however, the stable combustion region is degenerated to the retard-angle side, so that the optimal injection timing and the optimal ignition timing (point A), set under the standard atmospheric pressure P0, are not optimal values any longer under the intake air pressures P1 and P2, and stable combustion cannot be enjoyed under the intake air pressures P1 and P2.

The following is a description of a believable reason why the stable combustion region becomes narrower, as indicated by two-dot chain line, as the intake air pressure (intake air density) decreases.

Under the standard atmospheric pressure P0, the optimal injection timing is set in consideration of the arrival time for the fuel from the injection valve so that the fuel can reach a region near the spark plug when the piston is raised to a suitable position as air at the standard atmospheric pressure P0 is sucked into the cylinder.

When the intake air density decreases, however, the flowing speed of gases in the cylinder increases in proportion to the decrease of the intake air density, so that the required time for the fuel from the injection valve to reach the region around the spark plug is shortened. If fuel injection is carried out during low-density intake air at an optimal injection timing under the aforesaid standard atmospheric pressure P0, therefore, the fuel inevitably reaches the region near the spark plug before the piston rises to the suitable position. Thus, the fuel fails to concentrate near the spark plug (or the fuel is dispersed in the cylinder), so that satisfactory stratification cannot be achieved, and ignition may become difficult in some cases.

When the intake air density is low, therefore, the injection timing should be retarded correspondingly. If the injection timing is retarded, the ignition timing must be also retarded correspondingly in consideration of the fuel atomization time for stabilized combustion. Thus, when the intake air density is low, the stable combustion region, especially on the advance-angle side, is narrow at both the injection timing and the ignition timing.

In the case where the target air-fuel ratio is set in accordance with the target in-cylinder effective pressure Pe and if the quantity of fuel supply is set on the basis of this air-fuel ratio and the quantity of new charge (mass flow rate) introduced into the engine, the fuel supply quantity is reduced, since the new charge quantity decreases as the intake air density lowers. If the fuel supply quantity is reduced, the period during which the fuel is concentrated near the spark plug shortens, and correspondingly, the injection timing range for stable combustion is narrowed. If the fuel supply quantity is reduced, moreover, the fuel injection start timing changes (on the assumption that the injection termination timing is fixed), so that the arrival of the fuel at the region near the spark plug is delayed, and the ignition timing must be retarded in some cases.

Disclosed in Jpn. Pat. Appln. KOKAI Publication No. 60-36719, on the other hand, is a stratified-charge engine, in which a fuel from fuel supply means is supplied unevenly distributed to a region around an ignition system and fired to effect stratified-charge combustion at the time of operation under load, while the fuel is dispersedly supplied to the combustion chamber and fired to effect uniform combustion at high-load operation. According to the technique disclosed in this publication, however, the combustion mode is switched between stratified-charge combustion and uniform combustion, depending on required engine loads, and this switching point is changed in accordance with the intake air density, whereby smoking, lowering of ignition performance, etc. are restrained. However, no technique has been disclosed yet for correcting the optimal injection timing, optimal ignition timing, etc. in accordance with the intake air density.

The present invention has been contrived to solve the problems described above, and its object is to provide a control apparatus for an in-cylinder injection spark-ignition internal combustion engine, in which stratified-charge combustion can be carried out steadily and securely even if environmental parameter values, such as the atmospheric pressure, intake air temperature, etc., that are correlated with the intake air density are greatly different from those of the standard atmosphere during engine operation in an upland or the like.

In order to achieve the above object, according to claim 1 of the present invention, therefore, there is provided a control apparatus for an in-cylinder injection spark-ignition internal combustion engine, which has a fuel injection valve for injecting a fuel directly into a combustion chamber, and in which the fuel is injected mainly in a compression stroke, thereby undergoing stratified-charge combustion, when the internal combustion engine is operated in a specified operation region, comprising: target load setting means for setting a target load value corresponding to accelerator opening information based on a driver's operation at the least; environmental parameter value detecting means for detecting environmental parameter values correlated with an intake air density; target load correcting means for correcting the set target load value with use of the detected environmental parameter values; first control parameter value setting means for setting an engine control parameter value or values including a fuel injection timing and/or an ignition timing in accordance with the corrected target load value; and control means for executing the stratified-charge combustion in accordance with the set engine control parameter values.

The invention of claim 1 has been made on the basis of the following knowledge.

As mentioned before, the stable combustion region, indicated by full line in FIG. 1, is determined based on the result of the experiment on operation under the standard atmospheric pressure condition. In this connection, the in-cylinder effective pressure is substantially at a fixed value Pe0, and the optimal fuel injection timing and the optimal ignition timing correspond to point A. A stable combustion region, indicated by broken line in FIG. 1, is determined based on an experimental result obtained under the intake air pressure P1. The in-cylinder effective pressure obtained when the then intake air flow rate is converted for the standard atmospheric pressure state is at a value Pe1. Thus, the stable combustion region, indicated by broken line, can be regarded as a region that the intake air flow rate is converted for the standard atmospheric pressure state, and the ignition timing and the fuel injection timing for the stable combustion region are obtained at the in-cylinder effective pressure Pe1. At this time, the optimal fuel injection timing and the optimal ignition timing are obtained at point A1. Likewise, a stable combustion region, indicated by two-dot chain line in FIG. 1, is determined based on an experimental result obtained under the intake air pressure P2. The in-cylinder effective pressure, obtained when the then intake air flow rate, is converted for the standard atmospheric pressure state is at a value Pe2. Thus, the stable combustion region, indicated by two-dot chain line, can be regarded as a region that the intake air flow rate is converted for the standard atmospheric pressure state, and the ignition timing and the fuel injection timing for the stable combustion region are obtained at the in-cylinder effective pressure Pe2. At this time, the optimal fuel injection timing and the optimal ignition timing are obtained at point A2.

Thereupon, a similar result, such as the one shown in FIG. 2, can be obtained if individual stable combustion regions are looked for under conditions including a fixed in-cylinder effective pressure and a fixed air-fuel ratio that are defined by variously changing the intake air pressure or variously throttling the intake air. Full line in FIG. 2 indicates a stable combustion region for the case where the intake air is throttled in the standard atmospheric pressure state and the in-cylinder effective pressure is substantially at the value Pe1. Broken line indicates a stable combustion region obtained at the intake air pressure P1 of FIG. 1 (in-cylinder effective pressure is substantially at the value Pe1 in this case), while two-dot chain line indicates a stable combustion region for the case where the intake air is throttled under the intake air pressure P3 (P0>P3>P1) and the in-cylinder effective pressure is substantially at the value Pe1.

In the case where the in-cylinder effective pressure, obtained by converting the intake air flow rate for the standard atmospheric pressure state, is substantially fixed, as seen from FIG. 2, the stable combustion regions are substantially identical despite the variation in the intake air pressure (atmospheric pressure), and both the optimal injection timing and the optimal ignition timing are given by point A1.

Thus, it is believed that the injection timing and the ignition timing can be set at substantially equal values if the in-cylinder effective pressure is fixed. Based on this knowledge, stable stratified-charge combustion can be effected by previously correcting the target in-cylinder effective pressure for setting the engine control parameters, that is, the target load value, with the environmental parameter values correlated with the intake air density and then setting the engine control parameter values including the engine injection timing and/or the ignition timing with use of the thus corrected target load value.

In other words, if a stable stratified-charge combustion range is narrowed as the intake air density lowers in an upland or the like, the engine control parameter values, such as the fuel injection timing, ignition timing, etc., can be subjected accurately to atmospheric correction. Accordingly, stable stratified-charge combustion can be secured, and the drivability can be prevented from lowering.

According to the invention of claim 1, in particular, the target load value for setting the engine control parameter values is corrected in advance with the detected environmental parameter values, and the engine control parameter values including the fuel injection timing and/or ignition timing are then set in accordance with the corrected target load value. If matching test data for the standard atmospheric state are acquired, therefore, the engine control parameter values for stable stratified-charge combustion can be easily obtained from these data in an atmospheric state different from the standard atmospheric state. Thus, an engine control program is simple, and a matching test can be conducted with low man-hour.

The correction of the target load value with the environmental parameter values is not limited to any special method. Correction values may be read from a map in accordance with the environmental parameter values and used to multiply or add to the target load value. Alternatively, load correction values may be computed in accordance with deviations between the detected environmental parameter values and the environmental parameter values for the standard atmospheric state. These load correction values are used to multiply or are added to the target load value.

In order to correspond more accurately to the change of flow of the intake air caused by the reduction of the intake air density, the engine control parameters set by the target load value corrected with the intake air density may be further subjected to correction corresponding to the intake air density.

In the case where the target air-fuel ratio as an engine control parameter, besides the fuel injection timing or ignition timing, is set with use of the target load value, moreover, data for the injection timing and the ignition timing should preferably be set in accordance with the target load value subjected to intake air density correction, and data for the target air-fuel ratio should be set in accordance with the target load value not subjected to intake air density correction. This is because an air-fuel ratio for the low-load side is set to cause the engine output to lower if the load value for the air-fuel ratio setting is subjected to density correction.

According to the invention of claim 7, there is provided a control apparatus for an in-cylinder injection spark-ignition internal combustion engine, which has a fuel injection valve for injecting a fuel directly into a combustion chamber, and in which the fuel is injected mainly in a compression stroke, thereby undergoing stratified-charge combustion, when the internal combustion engine is operated in a specified operation region, comprising: target load setting means for setting a target load value corresponding to accelerator opening information based on a driver's operation at the least; rotational speed detecting means for detecting rotational speed of the internal combustion engine; second control parameter value setting means for setting an engine control parameter value in accordance with the set target load value and the detected engine rotational speed; environmental parameter value detecting means for detecting environmental parameter values correlated with an intake air density; control parameter correcting means for correcting an engine control parameter value or values including a set fuel injection timing and/or ignition timing with the detected environmental parameter values; and control means for executing the stratified-charge combustion in accordance with the corrected set engine control parameter values.

The invention of claim 7 has been made on the basis of the following knowledge.

As shown in FIG. 1, the individual optimal fuel injection timings and optimal ignition timings can be obtained at points A, A1, and A2 from the stable combustion regions that are obtained under the standard atmospheric pressure P0 and the intake air pressures P1 and P2. If the environmental parameter values correlated with the intake air density are different from those for the standard atmospheric state, therefore, stable stratified-charge combustion can be effected as well by correcting the engine control parameter values, which include the fuel injection timing and/or the ignition timing set in accordance with the target load value, corresponding to the degree of the aforesaid difference.

Thus, by correcting the engine control parameter values in accordance with the intake air density, the engine control parameter values, which include the fuel injection timing and/or the ignition timing, can be subjected accurately to atmospheric correction even if the stable stratified-charge combustion range is narrowed as the intake air density lowers in an upland or the like. Accordingly, stable stratified-charge combustion can be secured, and the drivability can be prevented from lowering.

The correction of the engine control parameter values with the environmental parameter values is not limited to any special method. Correction values may be read from a map in accordance with the environmental parameter values and used to multiply or add to the engine control parameter values. Alternatively, correction values may be computed in accordance with deviations between the detected environmental parameter values and the environmental parameter values for the standard atmospheric state. These correction values are used to multiply or are added to the engine control parameter values.

The control apparatus for an in-cylinder injection spark-ignition internal combustion engine according to the invention of claim 1 or 7 may be suitably applied to an engine controlled in a compression-stroke injection mode such that the fuel is injected mainly in the compression stroke, thereby undergoing stratified-charge combustion, when the engine is operated in the specified operation region, and is controlled in an intake-stroke injection mode such that the fuel is injected mainly in an intake stroke, whereby an air-fuel mixture with a uniform air-fuel ratio is formed for combustion in the combustion chamber, when the engine is operated outside the aforesaid specified operation region. Preferably, the engine control parameter values for the intake-stroke injection mode should be set with use of any of values including a volumetric efficiency Ev, charging efficiency ηv, intake air flow rate A/N per unit intake stroke, boost pressure Pb, etc. that are substantially correlated uniquely with an output requested by the driver and can be measured directly. Preferably, moreover, switching between the compression-stroke injection mode and the intake-stroke injection mode should be determined with use of the target load value set corresponding to the accelerator opening information based on the driver's operation.

Preferably, the engine control parameters should include the fuel injection timing or the ignition timing at the least, and naturally, may include both. The fuel injection timing may be an injection termination timing or an injection start timing. The fuel injection timing and the ignition timing are the most essential engine control parameters that require correction based on the intake air density. However, these engine control parameters may be any parameters that ensure stable stratified-charge combustion under different intake air density conditions. They include a target air-fuel ratio, exhaust reflux amount, opening of a bypass valve in a passage bypassing a throttle valve, that is, target bypass air flow rate, etc.

The environmental parameters correlated with the intake air may be the intake air itself or include the atmospheric pressure, atmospheric temperature, humidity, etc. The atmospheric pressure may be the intake air pressure detected by a pressure sensor provided in an air cleaner, for example. Likewise, the atmospheric temperature may be the intake air temperature or engine room temperature. Alternatively, the environmental parameters may be the pressure, temperature, or humidity, or a combination of a plurality of factors.

Although the target load value is set corresponding to the accelerator opening information based on the driver's operation at the least, it should preferably be set in accordance with the accelerator opening information and the engine speed. The accelerator opening information may be any one that is correlated with the engine output requested by the driver. For example, it may be the opening of the throttle valve or the depth of depression of an accelerator pedal in the case of an engine of the so-called fly-by-wire type. In the case where the engine load is applied as a result of load fluctuations of the transmission or operation of an air conditioner or power steering system, any of these engine loads may be added to the target load value.

It is to be understood that the engine control parameter values set by the engine control parameter value setting means may be further subjected to engine water temperature correction, learning correction to tackle engine deterioration, etc.

The "specified operation region," in which the fuel is injected mainly in the compression stroke for stratified-charge combustion, may be the entire operation region of the engine.

Moreover, the quantity of fuel supply, that is, fuel injection quantity, is set in accordance with the quantity of new charge or intake air value. Preferably, this intake air volume should be also corrected with environmental parameters correlated with the intake air density, whereby an appropriate fuel injection quantity can be set.

BRIEF DESCRIPTION OF THE DRAWINGS

FIG. 11 is a diagram illustrating an outline of a calculation map for target mean effective pressures PeB calculated in accordance with an opening θth of a throttle valve 28 and the engine speed Ne;

BEST MODE FOR CARRYING OUT THE INVENTION

Figure 1:
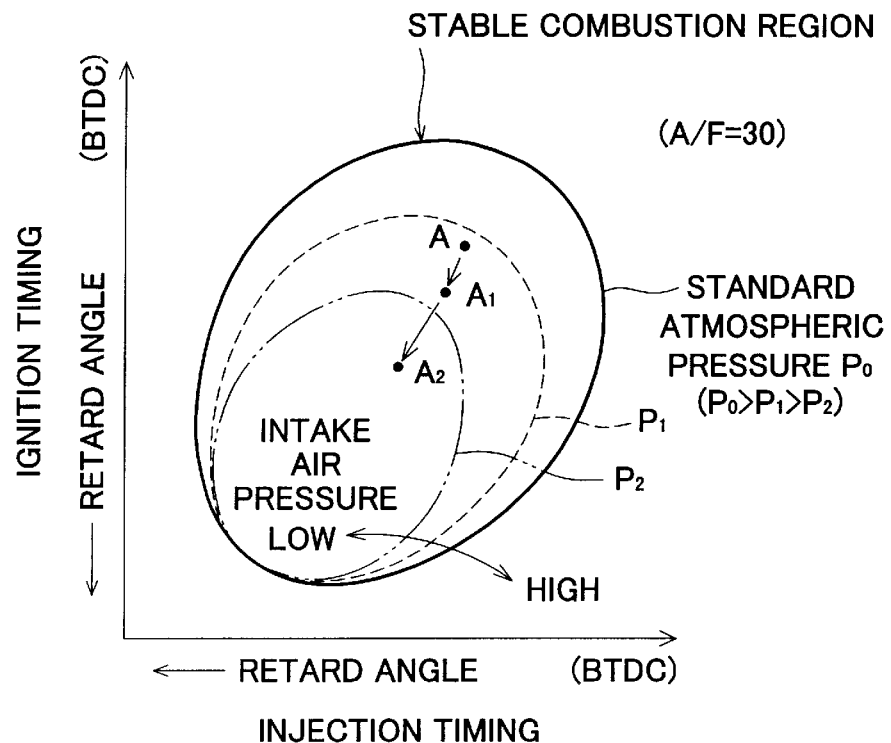
FIG. 1 is a graph showing a stable combustion regions obtained under different intake air pressure conditions in a compression-stroke injection mode of an in-cylinder injection spark-ignition internal combustion engine.

Referring now to the drawings, a mode for carrying out the present invention will now be described in detail in connection with embodiments 1 and 2. The embodiments 1 and 2 are different only in the steps of procedure for setting the fuel injection timing, ignition timing, etc. and are not different at all in hardware configuration. Therefore the hardware configuration will be described first.

Figure 3:
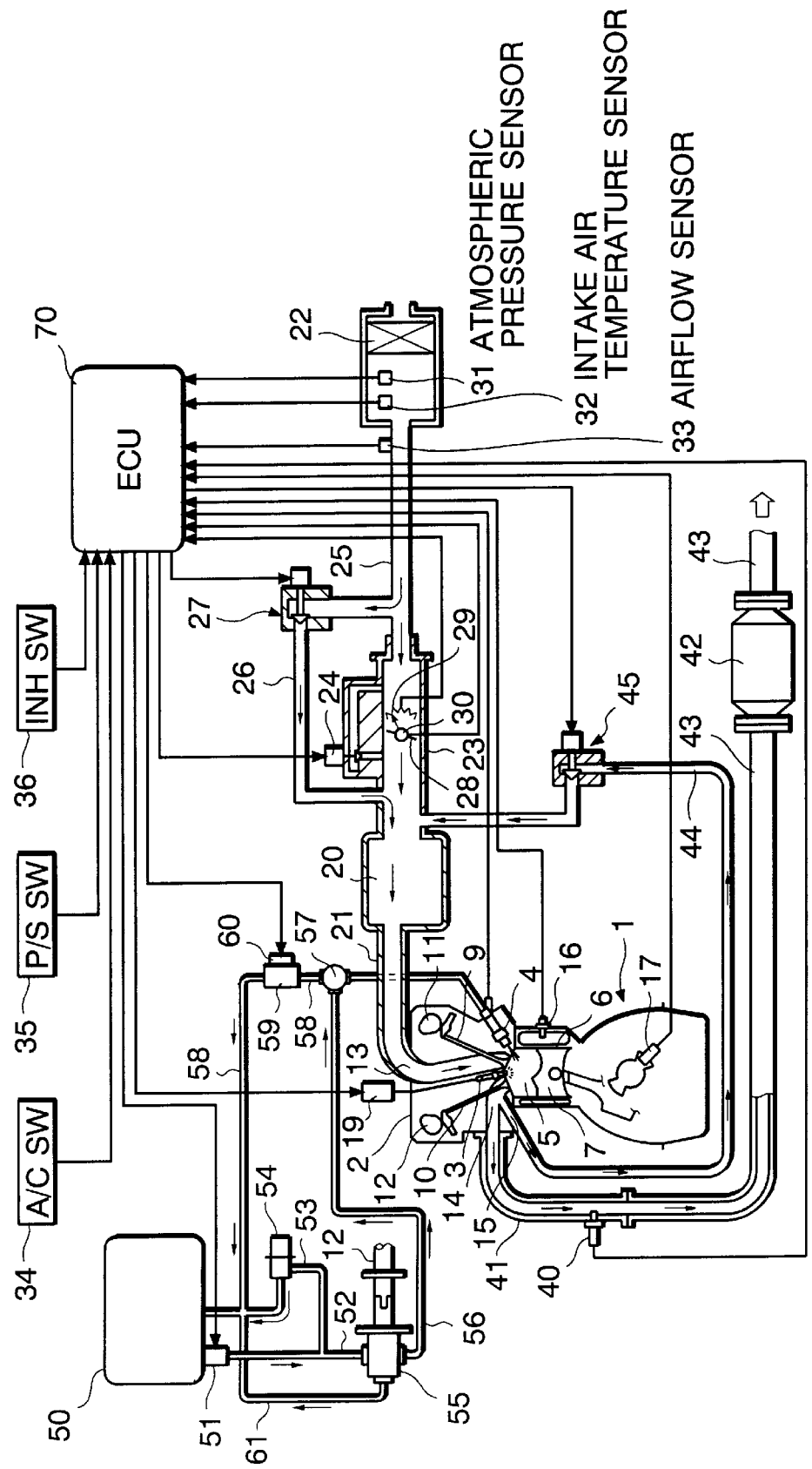
FIG. 3 is a schematic view of an engine control apparatus according to the present invention.
Figure 4:
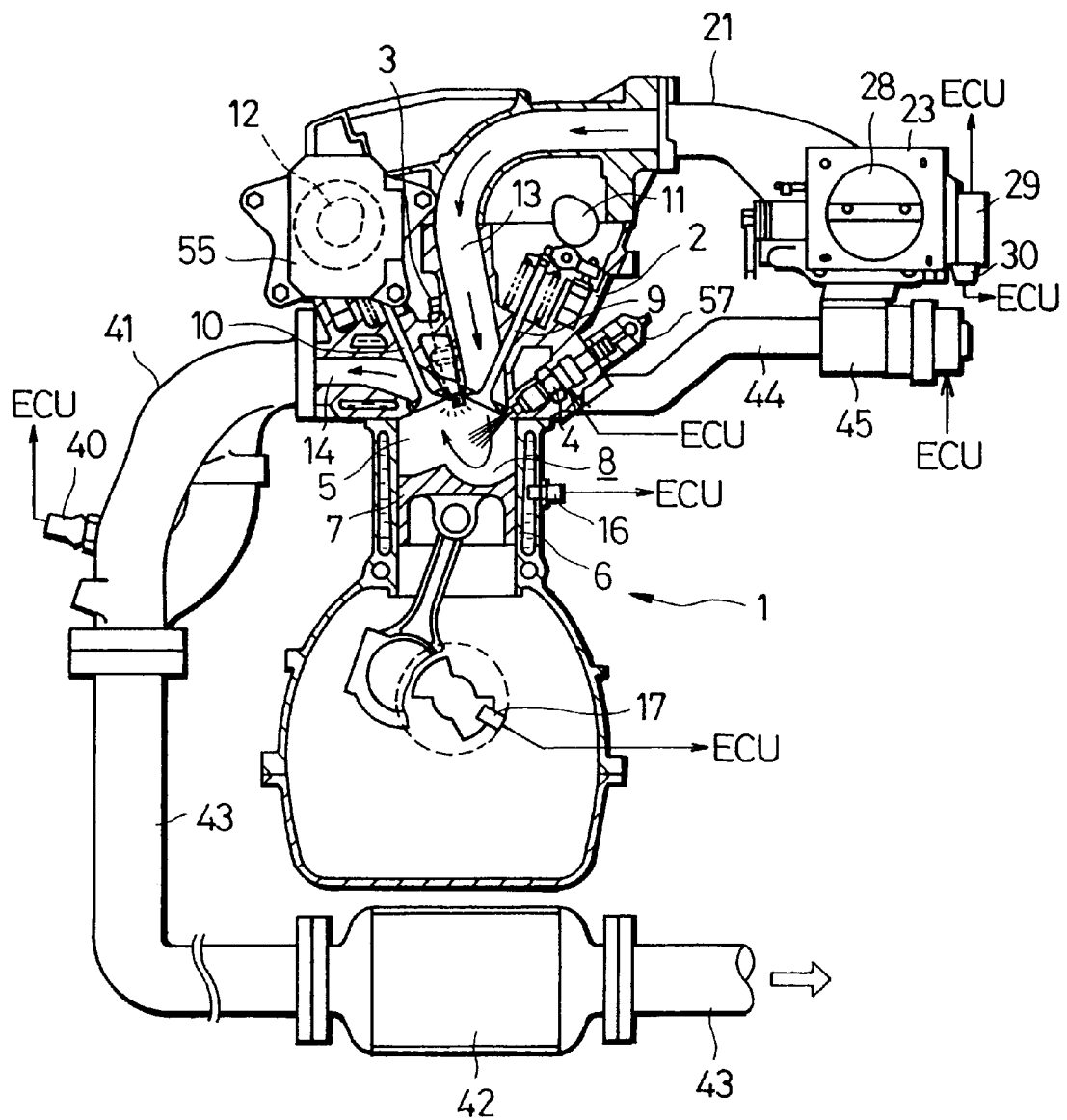
FIG. 4 is a vertical sectional view of an in-cylinder injection gasoline engine according to the present invention.

FIG. 3 is a schematic view showing one embodiment of a control apparatus for an in-cylinder injection gasoline engine according to the present invention mounted on a vehicle. FIG. 4 is a vertical sectional view of this in-cylinder injection gasoline engine. In these drawings, 1 denotes an in-line type in-cylinder injection four-cylindered gasoline engine (hereinafter referred to simply as engine) for an automobile, in which a combustion chamber 5, suction system, EGR system, etc. are designed exclusively for in-cylinder injection.

A cylinder head 2 of the engine 1 is fitted with a solenoid-operated fuel-injection valve 4, as well as a spark plug 3, for each cylinder, whereby a fuel can be injected directly into the combustion chamber 5. Further, a hemispherical cavity 8 is formed in the top face of a piston 7, which reciprocates sliding in a cylinder 6, in a position near the top dead center reached by a fuel spray from the fuel-injection valve 4 (FIG. 4). The theoretical compression ratio of this engine 1 is set to be higher (about 12 in the present embodiment) than that of a manifold fuel injection type. A DOHC four-valve system is used as a valve driving mechanism. An intake-side camshaft 11 and an exhaust-side camshaft 12 are rotatably held in the upper portion of the cylinder head 2, in order to drive intake and exhaust valves 9 and 10, respectively.

The cylinder head 2 is formed with intake ports 13, which extend substantially upright between the two camshafts 11 and 12, so that intake air currents having passed through the intake ports 13 generate reverse tumbling flows, which will be mentioned later, in the combustion chamber 5. On the other hand, an exhaust port 14, like that of a conventional engine, is formed extending substantially in the horizontal direction, and a large-diameter EGR port 15 (not shown in FIG. 4) diagonally diverges therefrom. In the drawing, 16 denotes a water temperature sensor for detecting a cooling water temperature Tw, 17 denotes a crank angle sensor that outputs a crank angle signal SGT in predetermined positions (5-BTDC and 75-BTDC) for each cylinder, and 19 denotes an ignition coil that delivers high voltage to the spark plug 3. Each camshaft, which rotates at half the speed of a crankshaft, is fitted with a cylinder discriminating sensor (not shown), which outputs a cylinder discriminating signal SGC, whereby the cylinder, for which the crank angle signal SGT is outputted, is discriminated.

As shown in FIG. 3, the intake ports 13 are connected to an intake pipe 25, which is provided with an air cleaner 22, a throttle body 23, and a speed control valve (hereinafter referred to as idle regulating valve) 24 of a stepper-motor type, through an intake manifold 21 that has a surge tank 20. Further, the intake pipe 25 is connected in parallel to a large-diameter air bypass pipe 26, through which intake air is introduced into the intake manifold 21, bypassing the throttle body 23, and this pipe is provided with a large-sized air bypass valve (referred to as ABV valve) 27 of a linear-solenoid type. The air bypass valve 26 has a flow area substantially equal to that of the intake pipe 25, and allows circulation of a required amount of intake air for a low or medium speed region of the engine 1 when the ABV valve 27 is fully open. On the other hand, the idle regulating valve 24 has a flow area smaller than that of the ABV valve 27. The idle regulating valve 24 is used for accurately regulating the amount of intake air.

The throttle body 23 is provided with a butterfly-type throttle valve 28 for opening and closing its passage, and also a throttle position sensor 29 for detecting accelerator opening information by detecting an opening θth of the valve 28 and an idle switch 30 for detecting a fully-closed state thereof. An atmospheric pressure sensor 31 and an intake air sensor 32 for obtaining the intake air density are arranged in the air cleaner 22, and output signals corresponding to an atmospheric pressure Pa and an intake air temperature Ta, respectively. Further, a Karman-vortex airflow sensor 33 is located near the inlet of the intake pipe 25, and outputs a vortex generating signal proportional to a volume air flow rate Qa per intake stroke.

On the other hand, the exhaust port 14 is connected to an exhaust pipe 43, which is provided with a three-way catalyst 42, muffler (not shown), etc. through an exhaust manifold 41, which is fitted with an $O_2$ sensor 40. Also, the EGR port 15 is connected to the downstream side of the throttle valve 28 and the upstream side of the intake manifold 21 through a large-diameter EGR pipe 44, whose line is provided with an EGR valve 4 of a stepper-motor type.

A fuel tank 50 is provided in the rear portion of the body (not shown) of the vehicle. The fuel stored in the fuel tank 50 is sucked by means of a motor-operated low-pressure fuel pump 51, and is supplied to the engine 1 through a low-pressure feed pipe 52. The fuel pressure in the feed pipe 52 is adjusted to a relatively low pressure (3.0 $kgf/cm^2$ in the present embodiment, hereinafter referred to as low fuel pressure) by means of a first fuel pressure regulator 54, which is inserted in the line of a return pipe 53. The fuel supplied to the engine 1 is fed into each fuel injection valve 4 through a high-pressure feed pipe 56 and a delivery pipe 57 by means of a high-pressure fuel pump 55, which is attached to the cylinder head 2. In the case of the present embodiment, the high-pressure fuel pump 55 is of a swash-plate axial-piston type, and is driven by the exhaust-side camshaft 12 or the intake-side camshaft 11. The pump 55 has an oil transfer capacity high enough to produce a fuel pressure of 50 $kgf/cm^2$ or more even when the engine 1 is in idle operation. The fuel pressure in the delivery pipe 57 is adjusted to a relatively high pressure (50 $kgf/cm^2$ in the present embodiment, hereinafter referred to as high fuel pressure) by a second fuel pressure regulator 59. In the drawing, 60 denotes a solenoid-operated fuel pressure selector valve attached to the second fuel pressure regulator 59, and is adapted to relieve the fuel to lower the fuel pressure in the delivery pipe 57 to a predetermined value (e.g., 3.0 $kgf/cm^2$) when it is on. Further, 70 denotes a return pipe through which the fuel is returned to the fuel tank 50 after it is used to lubricate or cool the high-pressure fuel pump 55.

An ECU (electronic control unit) 70 is set in the cabin of the vehicle. This ECU 70 is furnished with an input-output unit (not shown), storage unit (ROM, RAM, nonvolatile RAM, etc.) used to store control programs, control maps, etc., central processing unit (CPU), timer counter, etc., and carries out general control of the engine 1.

The input side of the ECU 70 is connected to switches for detecting the respective operating states of an air conditioner, power steering system, automatic transmission, etc., that is, an air conditioner switch (A/C SW) 34, power steering switch (P/S SW) 35, inhibitor switch (INH SW) 36, etc., and supplies individual detection signals to the ECU 70. The input side of the ECU 70 is connected to a large number of switches and sensors (not shown), as well as the aforesaid various sensors and switches, and the output side is also connected to various warning lamps, lamps, etc.

Based on input signals from the aforesaid various sensors and switches, the ECU 70 determines a fuel injection termination timing, ignition timing, EGR gas introduction rate, etc., as well as a fuel injection mode and fuel injection quantity, and drivingly controls the fuel injection valve 4, ignition coil 19, EGR valve 45, etc.

The following is a brief description of the basic flow of engine control.

When a driver turns on the ignition key to start the engine, the ECU 70 switches on the low-pressure fuel pump 51 and the fuel pressure selector valve 60, whereupon the fuel injection valve 4 is supplied with the fuel at low fuel pressure. This is done because when the engine 1 is stopped or cranking, the high-pressure fuel pump 55 does not operate at all or operates only imperfectly, so that the fuel injection quantity must inevitably be determined in accordance with the discharge pressure of the low-pressure fuel pump 51 and the valve-open time of the fuel injection valve 4. When the driver further turns the ignition key to start a cranking operation, the engine 1 is cranked by a self starter (not shown), and at the same time, fuel injection control by the ECU 70 is initiated. At this point in time, the ECU 70 selects an intake-stroke injection mode and injects the fuel in a manner such that the air-fuel ratio is relatively rich. This is done because when the engine is cold, the evaporation rate is so low that a misfire or discharge of combustible fuel (HC) is unavoidable if the injection is carried out in a compression-stroke injection mode. At the start of operation, moreover, the ECU 70 closes the ABV valve 27, so that the intake air is fed into the combustion chamber 5 through a gap around the throttle valve 28 or the idle regulating valve 24. The idle regulating valve 24 and the ABV valve 27 are controlled unitarily by the ECU 70, and their respective opening amount are settled depending on the required introduction rate of the intake air (bypass air) that bypasses the throttle valve 78.

When the engine 1 starts an idle operation after the starting is completed, the high-pressure fuel pump 55 initiates a rated discharge operation, so that the ECU 70 turns off the fuel pressure selector valve 60, and supplies the fuel at high fuel pressure to the fuel injection valve 4. Naturally, in doing this, the fuel injection quantity is settled in accordance with the high fuel pressure and the valve-open time of the fuel injection valve 4. Until the engine cooling water temperature Tw is raised to predetermined value, the ECU 70 selects the intake-stroke injection mode and injects the fuel, just as at the time of the engine starting, and the ABV valve 27 also continues to be closed. The idle speed control that varies depending upon the loads of accessories, such as the air conditioner, is carried out by the idle regulating valve 24 (ABV valve 27 is also opened if necessary), as in the case of the manifold-injection type. When an activation temperature of the $O_2$ sensor 40 is reached after the passage of a predetermined cycle, moreover, the ECU 70 starts air-fuel ratio feedback control in accordance with the output voltage of the $O_2$ sensor 40, and causes the three-way catalyst 42 to purify harmful exhaust gas components. Thus, when the engine is cold, fuel injection control is effected substantially in the same manner as in the case of manifold-injection type. Since no fuel drops adhere to the wall surface of the intake pipe 1, however, the response and accuracy of control are enhanced.

Figure 5:
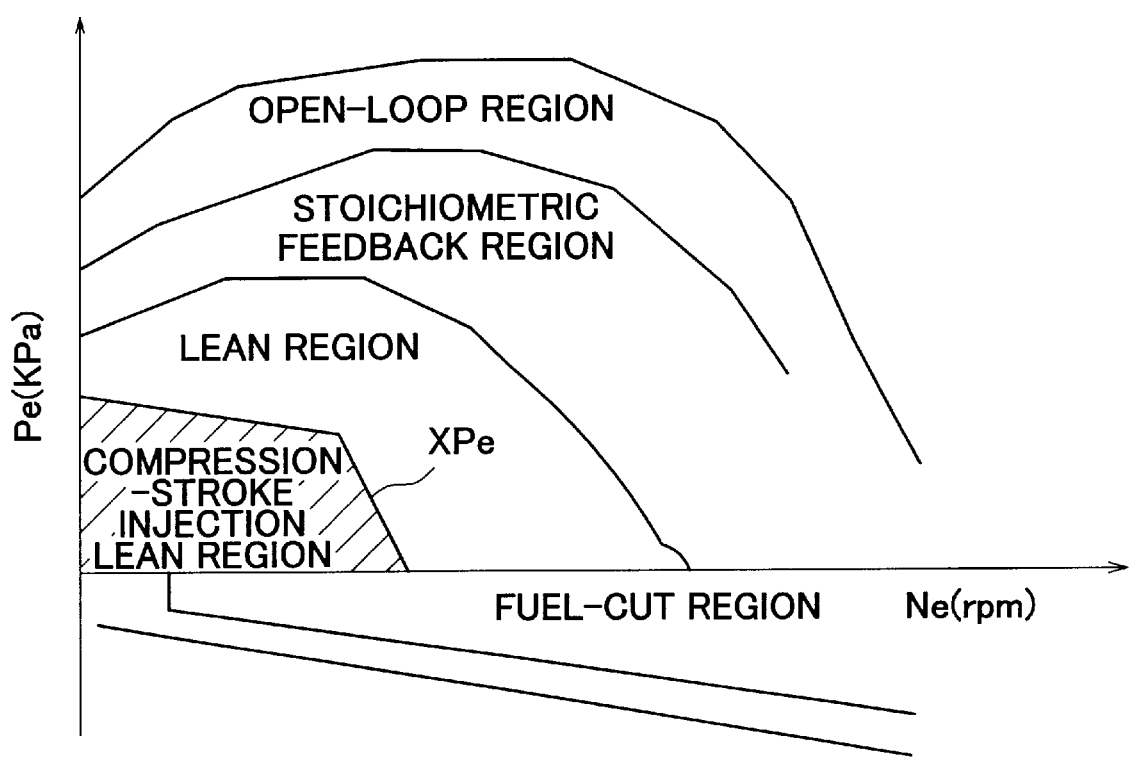
FIG. 5 is an engine control mode map showing a compression-stroke injection lean operation region, intake-stroke injection lean operation region, stoichiometric feedback operation, etc. defined in accordance with an engine in-cylinder mean effective pressure Pe and an engine speed Ne.

When warming up of the engine 1 is finished, the ECU 70 retrieves a present fuel injection control region from a fuel injection control map of FIG. 5 in accordance with a target in-cylinder effective pressure (target load) Pe, which is obtained from the throttle opening θth, etc., and an engine speed Ne, determines the fuel injection mode and fuel injection quantity, drives the fuel injection valve 4, and besides, performs valve-opening control for the ABV valve 27 and the EGR valve 45 and the like.

Figure 6:
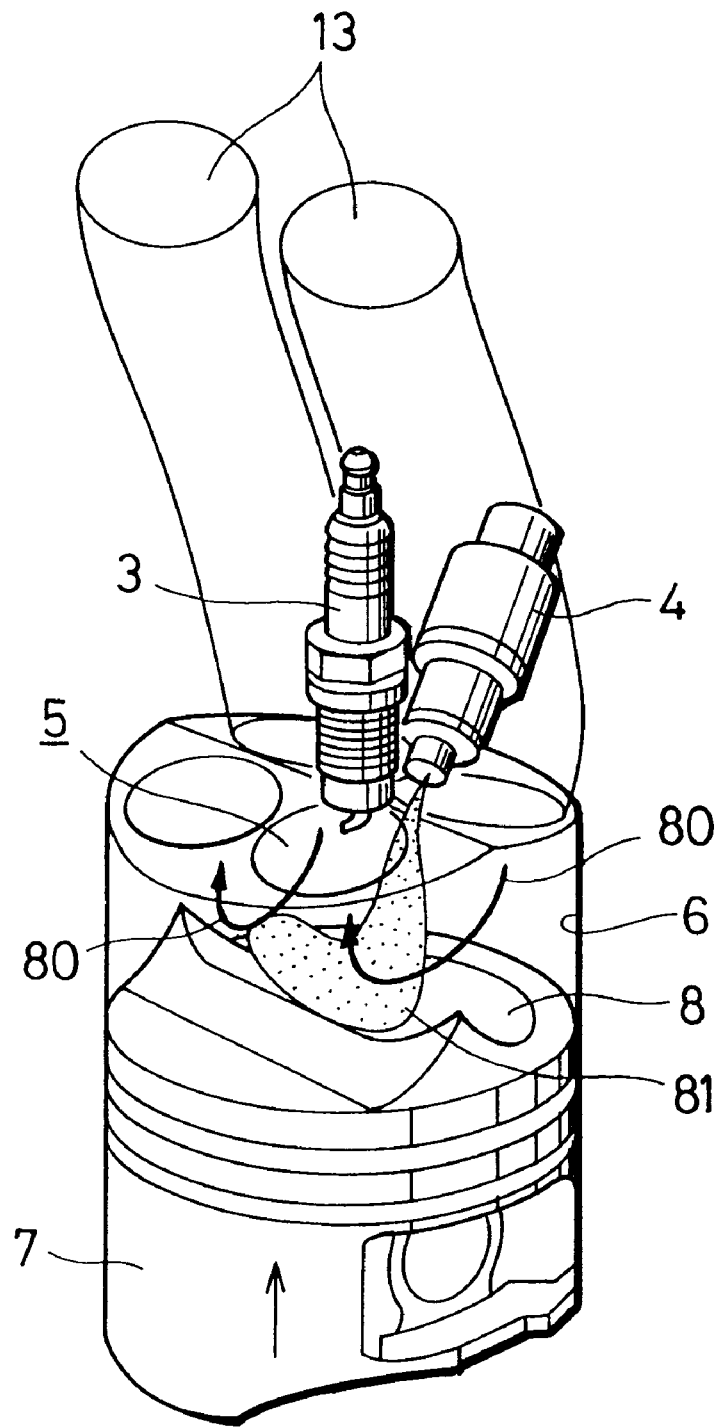
FIG. 6 is a diagram illustrating a form of fuel injection in a compression-stroke injection mode of an in-cylinder injection spark-ignition internal combustion engine according to the present invention.

Since low-load low-rotation operation, such as idle operation, corresponds to a compression-stroke injection lean region indicated by hatching in FIG. 5, the ECU 70 selects the compression-stroke fuel injection mode, opens the ABV valve 27 and the EGR valve 40 in accordance with the operating state, and injects the fuel to obtain a lean air-fuel ratio (about 20 to 40 in the present embodiment). At this point in time, the evaporation rate of the fuel increases, and the intake air currents introduced through the intake ports 13 generate reverse tumbling flows 80, as indicated by the arrows in FIG. 6, so that a fuel spray 81 is kept in the cavity 8 of the piston 7. In consequence, an air-fuel mixture of an air-fuel ratio near a stoichiometric air-fuel ratio is formed around the spark plug 3 at the time of ignition, so that the fuel can ignite even with a very lean overall air-fuel ratio (e.g., overall air-fuel ratio of about 50). Accordingly, the deliveries of CO and HC are reduced to very low levels, and the delivery of $NO_x$ is also lowered by the reflux of the exhaust gas. Also on account of reduction in pumping loss caused when the ABV valve 27 and the EGR valve 40 are opened, the fuel consumption ratio can be improved considerably. Moreover, the idle speed control, which depends on the variation of the loads, is carried out by increasing or decreasing the fuel injection quantity, so that the control response is very high.

In the compression-stroke injection mode, the fuel spray injected from the fuel injection valve 4 must be carried by the aforesaid reverse tumbling flows to reach the spark plug 3, and the fuel must be evaporated to form an easily ignitable air-fuel mixture by the time of ignition after the arrival. If the mean air-fuel ratio is reduced to a predetermined or lower value (e.g., 20), a locally overrich air-fuel mixture is generated near the spark plug 3, so that a so-called rich misfire occurs. If the ratio is higher than a predetermined value (e.g., 40), on the other hand, the lean limit is exceeded, so that a misfire (so-called lean misfire) easily occurs. As mentioned later, therefore, the timings for the start and termination of the fuel injection and the ignition timing can be controlled accurately, and the mean air-fuel ratio can be set within a predetermined range (e.g., 20 to 40). If the mean air-fuel ratio is at a predetermined value (e.g., 20) or below, the injection mode is switched over to the intake-stroke injection mode (mentioned later).

At the time of low- or medium-speed drive, on the other hand, the engine is operated in a lean region based on the intake-stroke injection mode or a stoichiometric feedback region (stoichiometric air-fuel ratio feedback control region) of FIG. 5, depending on the load state and the engine speed Ne, so that the ECU 70 selects the intake-stroke injection mode and injects the fuel to obtain a predetermined air-fuel ratio.

Figure 7:
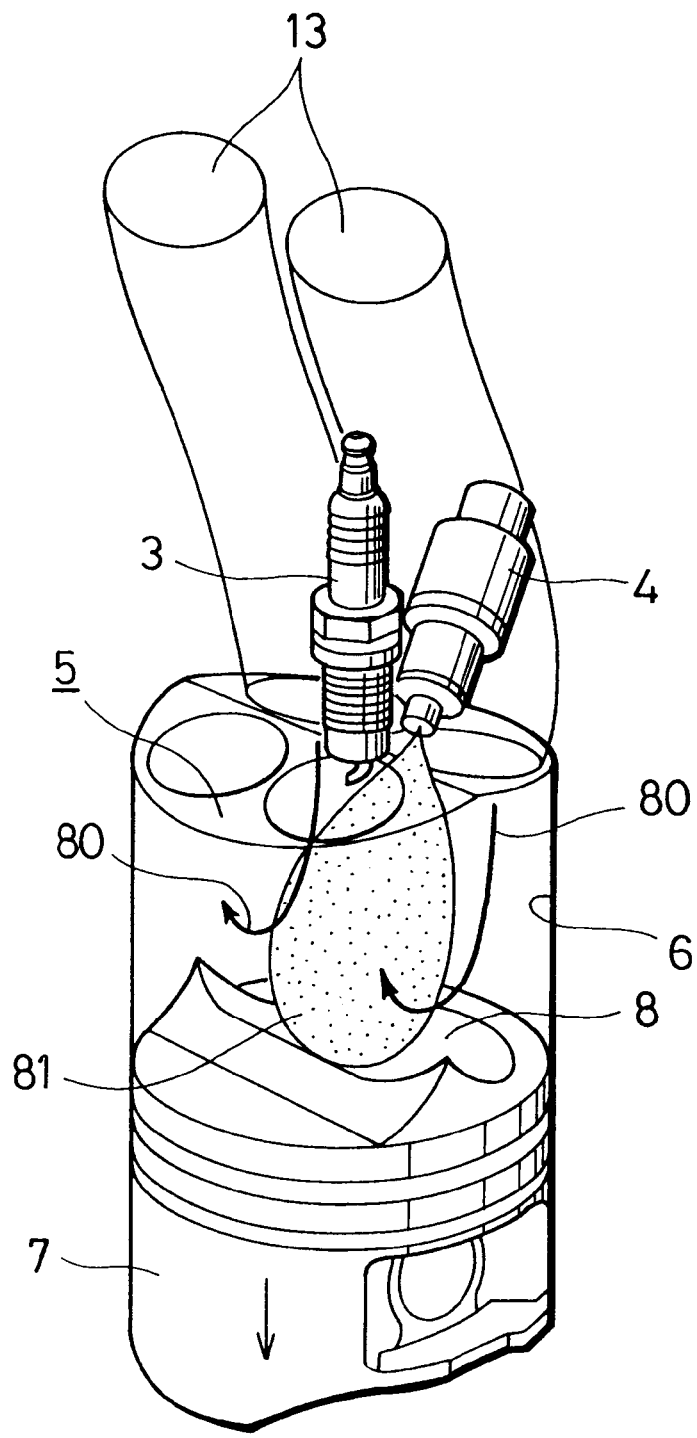
FIG. 7 is a diagram illustrating a form of fuel injection in an intake-stroke injection mode of the in-cylinder injection spark-ignition internal combustion engine according to the present invention.

More specifically, the opening of the ABV valve 27 and the fuel injection quantity are controlled to obtain a relatively lean air-fuel ratio (e.g., about 20 to 23) in the lean region of the intake-stroke injection mode. In the stoichiometric feedback region, moreover, the ABV valve 27 and the EGR valve 45 are subjected to open-close control (open-close control of the EGR valve 45 is carried out only in a specific region), and the air-fuel ratio feedback control is carried out in accordance with the output voltage of the $O_2$ sensor 40. Since the intake air currents introduced through the intake ports 13 generate the reverse tumbling flows 80, as shown in FIG. 7, the fuel can be ignited even with a lean air-fuel ratio by adjusting the fuel injection start or termination timing, owing to the effect of a turbulence attributable to the reverse tumbling flows. In the stoichiometric feedback region, a high output can be obtained with use of a relatively high compression ratio, and the harmful exhaust gas components are purified by means of the three-way catalyst 42.

At the time of sudden acceleration or high-speed drive, an open-loop control region shown in FIG. 5 is reached, so that the ECU 70 selects the intake-stroke injection mode, closes the ABV valve 27, and injects the fuel to obtain a relatively rich air-fuel ratio in accordance with the throttle opening θth, engine speed Ne, etc. In this case, the compression ratio is high, the intake air currents generate the reverse tumbling flows 80, and besides, the intake ports 13 extend substantially upright from the combustion chamber 5, so that a high output can be obtained also by an effect of inertia.

During coasting operation in the middle of medium- or high-speed drive, moreover, the ECU 70 entirely stops the fuel injection. Consequently, the fuel consumption ratio is improved and the deliveries of harmful exhaust gas components are reduced. Fuel-cut operation is suspended immediately when the engine speed Ne falls below the return speed or when the driver steps on the accelerator pedal.

The following is a description of steps of procedure according to the present invention for setting parameters (engine control parameter values) that influence the combustion state in the engine combustion chamber 5 set in accordance with the target mean effective pressure (target load) Pe, that is, a valve-open time Tinj of the fuel injection valve 4, fuel injection termination timing Tend, ignition timing Tig, opening area Legr of the EGR valve 45, etc.
(Setting Procedure of Embodiment 1)

Figure 8:
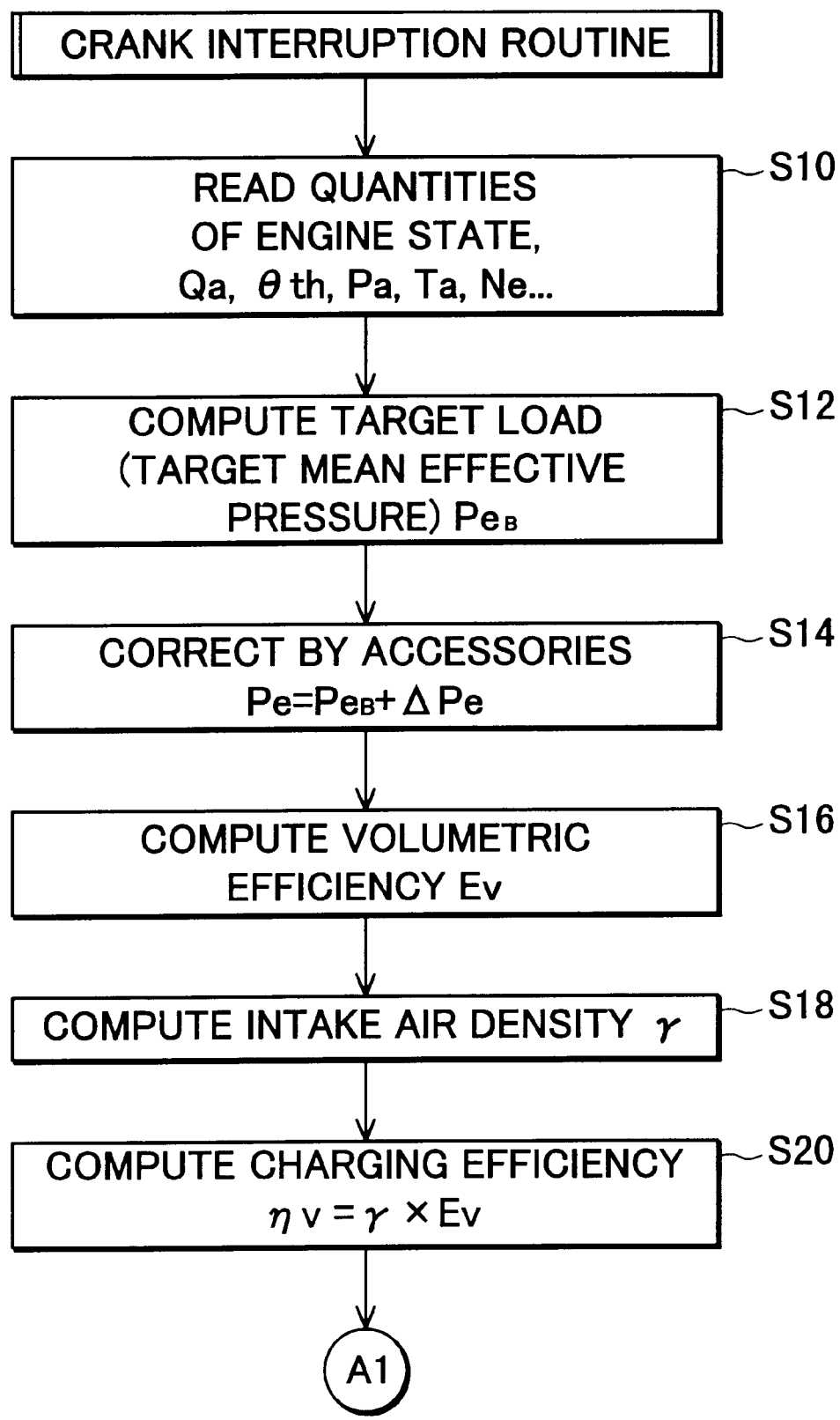
FIG. 8 is a part of a flowchart of a crank interruption routine showing steps of procedure for calculating engine control parameter values, such as a target mean effective pressure Pe, target air-fuel ratio AF, fuel injection termination period Tend, ignition timing Tig, opening Legr of an EGR valve 45, etc., and controlling the engine in accordance with the calculated engine control parameter values.
Figure 9:
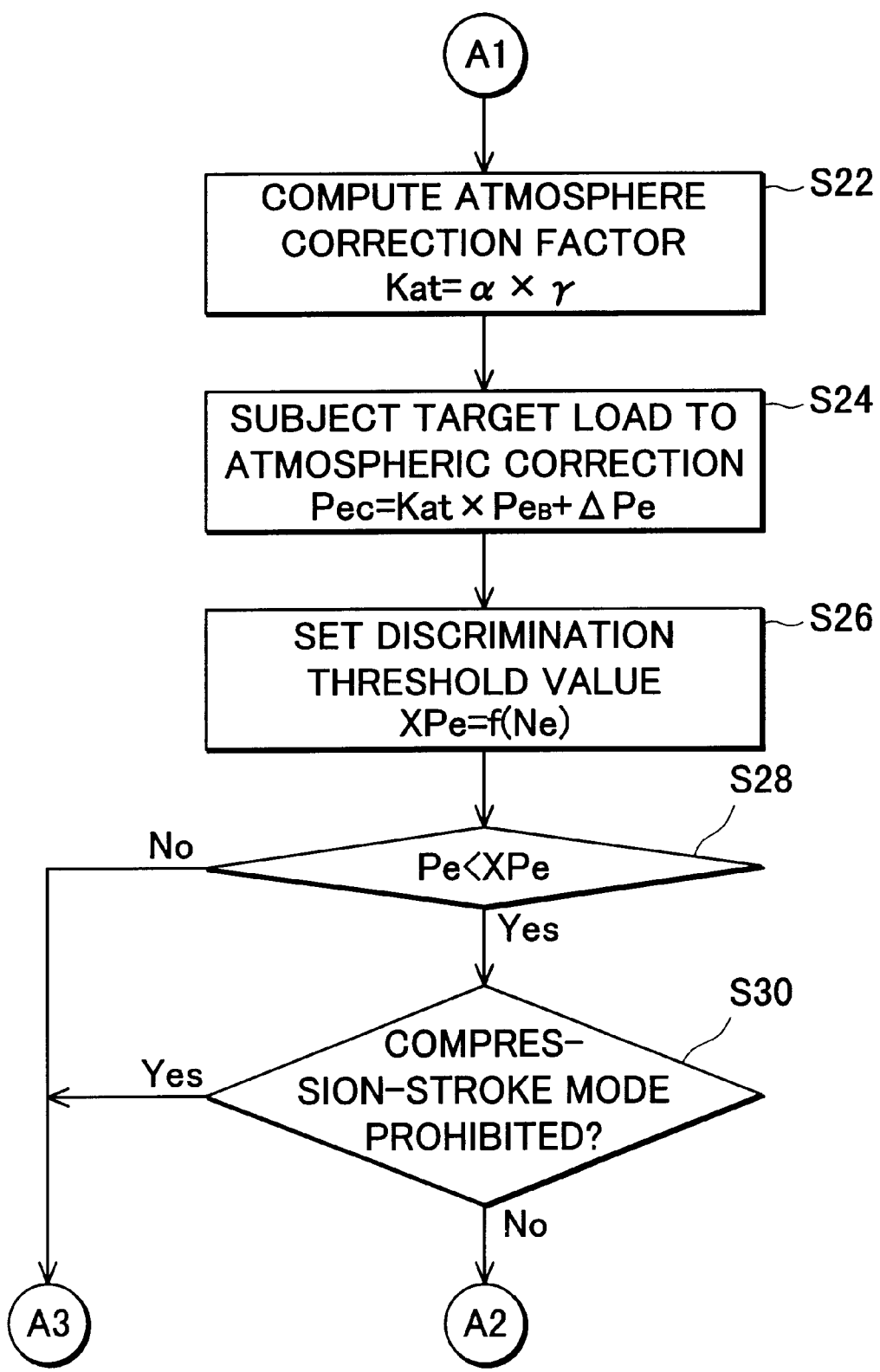
FIG. 9 is another part of the flowchart of the crank interruption routine continued from the flowchart of FIG. 8.
Figure 10:
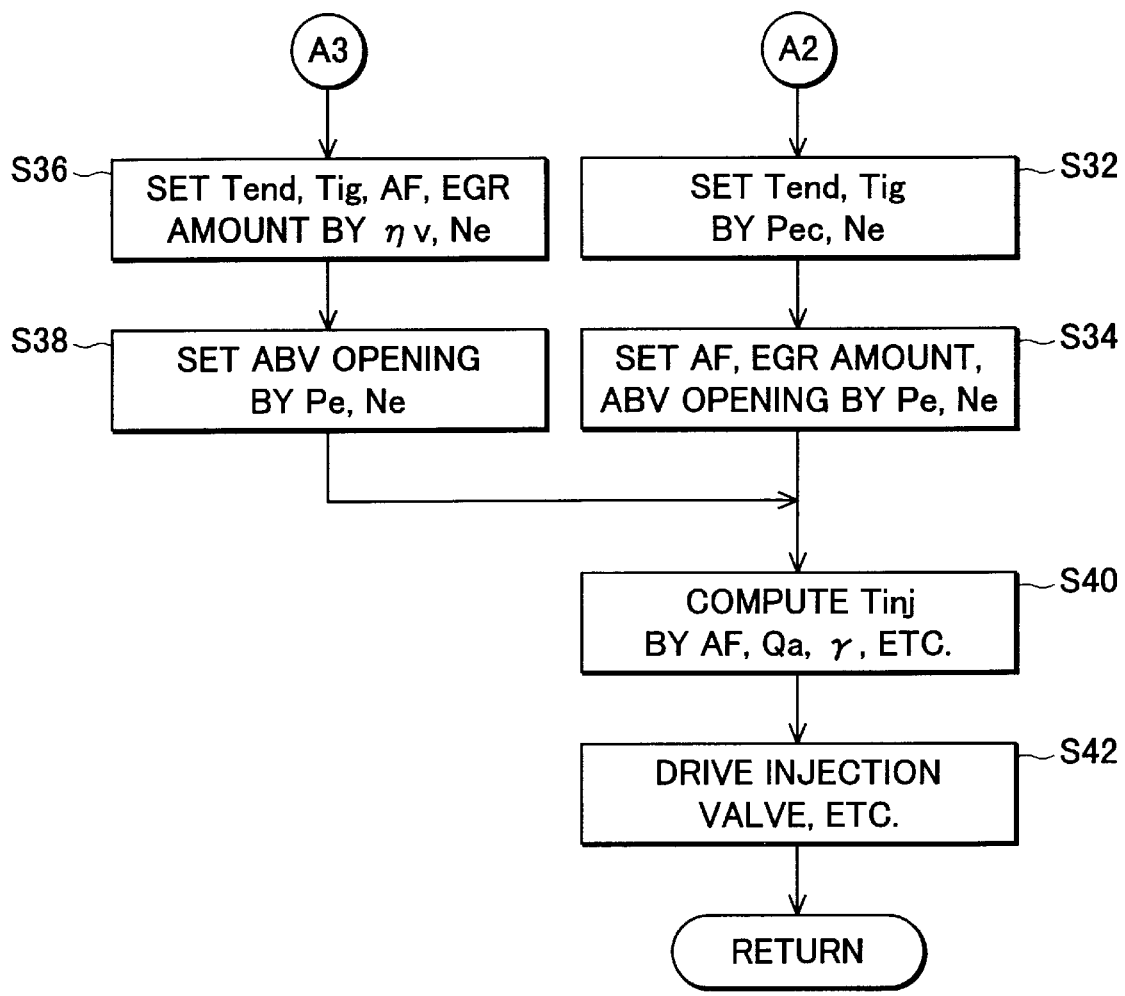
FIG. 10 is the remainder portion of the flowchart of the crank interruption routine continued from the flowchart of FIG. 9.

The flowcharts of FIGS. 8 to 10 show steps of procedure for setting various engine control parameter values according to Embodiment 1, which are executed by interrupt operation by the ECU 70 every time the crank angle signal is outputted from the crank angle sensor 17.

First, in Step S10 of FIG. 8, the ECU 70 reads various quantities of engine state, such as the intake air volume (volume air flow rate) Qa per intake stroke detected by the airflow sensor 33, throttle valve opening θth detected by the throttle position sensor 19, atmospheric pressure Pa detected by the atmospheric pressure sensor 31, intake air temperature Ta detected by the intake air temperature sensor 32, engine speed (rotational speed) Ne detected from a crank angle signal generation time interval from the crank angle sensor 17, operating state of the air conditioner detected by the air conditioner switch 33, etc.

Then, the ECU 70 computes a target mean effective pressure PeB corresponding to the throttle valve opening θth and the engine speed Ne detected by the throttle position sensor 29 and the crank angle sensor 17, with reference to a target mean effective pressure map previously stored in the aforementioned storage unit (Step S12). FIG. 11 shows an outline of the target mean effective pressure map. Target mean effective pressures PeBij corresponding to the driver's required outputs, based on the throttle valve opening θth and the engine speed Ne, are mapped and stored in the storage unit of the ECU 70. These individual data are values that are set experimentally by using, e.g., net mean effective pressures as target mean effective pressure information, with which data can be easily collected in a bench test on the engine. Referring to this map, the ECU 70 computes the optimal target mean effective pressure PeB corresponding to the detected throttle valve opening θth and engine speed Ne by, for example, the conventional four-point interpolation method or the like.

In this embodiment, the net mean effective pressure Pe is used as target load information. Unless there is any special hindrance to the data collection in the bench test on the engine, however, various other data, such as the illustrated mean effective pressures, net outputs, etc., may be used instead.

Then, the program advances to Step S14, whereupon the target mean effective pressure Pe, as a target, is obtained by adding accessory correction to the target mean effective pressure PeB.

$$Pe=PeB+\Delta Pe. \quad (M1)$$

The storage unit of the ECU 70 is furnished with an output correction map for various load devices (accessories), such as the air conditioner, power steering system, transmission, etc., which constitute mechanical and electrical loads. A target mean effective correction value ΔPe corresponding to the engine speed Ne is delivered from the output correction map in response to on-signals from the switches 34 to 36 for detecting the operations of these load devices. This correction value ΔPe is added to the target mean effective pressure PeB obtained in Step S12, and correction is carried out in accordance with accessories in operation. The target mean effective pressure Pe thus calculated may be subjected as required to filtering to be cleared of noise components and to stabilize the control.

In Step S16, a volumetric efficiency Ev is computed. This volumetric efficiency Ev can be easily computed by dividing the intake air flow rate (volume flow rate) Qa detected by the airflow sensor 33 by the capacity of the combustion chamber 5. Then, in Step S18, an intake air density (environmental parameter value) γ. The intake air density γ can be easily computed from the intake air temperature Ta and the atmospheric pressure Pa according to a conventional Boyle-Charles operational expression. A charging efficiency ηv is computed from the volumetric efficiency Ev and the intake air density γ obtained in Step S20, according to the following expression.

$$\eta v=\gamma \times Ev. \quad (M2)$$

Then, the ECU 70 advances to Step S22 of FIG. 9, whereupon it computes a correction factor value (reduction coefficient value for a standard atmospheric state) Kat for atmospheric correction of the target mean effective pressure PeB according to the following expression (M3).

$$Kat=\alpha \times \gamma. \quad (M3)$$

Here α is a constant. If the intake air density takes a value smaller than its standard value, the correction factor value Kat is set at a value smaller than 1.

The correction factor value Kat, thus obtained, is applied to the following expression (M4) and subjects the target mean effective pressure PeB to atmospheric correction.

$$Pec=Kat \times PeB+\Delta Pe. \quad (M4)$$

In expression (M1), only the value PeB (only the term associated with the intake air volume) set in accordance with the throttle valve opening θth and the engine speed Ne requires atmospheric correction, and ΔPe, an accessory correction value, need not be multiplied by the correction factor value Kat. This is so because the necessary engine torque for the drive of the accessories, such as the air conditioner, hardly varies depending on the topography, level ground or high ground.

Then, in Step S26, a discrimination threshold value XPe for determining the injection mode, the intake-stroke injection mode or the compression-stroke injection mode, in which the engine is to be controlled is set in accordance with the engine speed Ne. The boundary between the compression-stroke injection lean region, indicated by hatching in FIG. 5, and the intake-stroke injection region represents the relation between the discrimination threshold value XPe and Ne, so that the discrimination threshold value XPe can be obtained from this relation.

In Steps S28 and S30, it is determined whether or not the engine is to be controlled in the compression-stroke injection mode. In Step S28, the obtained discrimination threshold value XPe and the target mean effective pressure Pe obtained in Step S14 are compared, and it is determined whether or not the target mean effective pressure Pe is smaller than the discrimination threshold value XPe. In Step S30, it is determined whether or not the operating state is a state in which the control based on the compression-stroke injection mode is to be prohibited, such as an operating state, in which the warm-up operation is not completed yet.

The reason why the value Pec subjected to intake air density correction is not used in Step S28 as the target mean effective pressure data to be compared with the discrimination threshold value XPe is that use of Pec causes the compression-stroke injection lean region to enlarge extraordinarily and produces smoke or the like.

In the case where the target mean effective pressure Pe is not lower than the discrimination threshold value XPe so that the conclusion in Step S28 is negative (No), or in the case where the operating state is one in which the control based on the compression-stroke injection mode is to be prohibited so that the conclusion in Step S30 is positive (Yes), the program advances to Step S36 of FIG. 10, whereupon computation of the various engine control parameter values based on the intake-stroke injection mode is carried out. In the case where the conclusions in Steps S28 and S30 are positive and negative, respectively, on the other hand, the program advances to Step S32 of FIG. 10, whereupon computation of the various engine control parameter values based on the compression-stroke injection mode is carried out.

The computation of the various engine control parameter values based on the intake-stroke injection mode will be described first. In Step S36, the fuel injection termination timing Tend, the ignition timing Tig, a target air-fuel ratio AF, and an EGR value (opening area Legr of the EGR valve 45) are set in accordance with the charging efficiency ηv and the engine speed Ne. In the intake-stroke injection mode, as mentioned before, the output can be determined substantially uniquely in accordance with the volume of air introduced into the cylinder. In this embodiment, therefore, the charging efficiency ηv obtained by subjecting the volumetric efficiency Ev to intake air density correction is used. In a possible method for setting the engine control parameter values in accordance with the charging efficiency ηv and the engine speed Ne, suitable values should only be read from the map in accordance with the charging efficiency ηv and the engine speed Ne, as in the case of the computation of the target mean effective pressure PeB in Step S12. In this embodiment, the engine control parameter values are set by using, in place of the volumetric efficiency Ev, the charging efficiency ηv corrected by means of the intake air density γ. Even under atmospheric conditions such as ones in an upland, including a low intake air density, therefore, optimal engine control parameter values can be set corresponding to the intake air density.

Also in the intake-stroke injection mode, however, the opening of the ABV valve 27 is computed according to the target mean effective pressure Pe and the engine speed Ne (Step S38). When the ABV valve 27 is fully open, air can be supplied through the bypass valve 26 to the engine 1 in a volume equivalent to the one obtained when the throttle valve 28 is fully open. Thus, if the opening of the ABV valve 27 is controlled by using the volumetric efficiency Ev and the charging efficiency ηv when the throttle valve 28 is opened by the driver in case of insufficient output, the ABV valve 27 is also driven in the valve-opening direction. Since a large volume of intake air is allowed to flow after the slightest correction in the valve-opening direction, however, an excessive volume of air may possibly flow into the cylinder, thereby worsening the combustion. If the combustion is worsened, there is a possibility of diffusion in control such that the output becomes more insufficient, the driver opens the throttle valve 28 further, and in consequence, the ABV valve 27 is opened additionally. Accordingly, the control can be stabilized by setting the opening of the ABV valve 27 in accordance with the target mean effective pressure Pe and the engine speed Ne that are set corresponding to the opening θth of the throttle valve 28, that is, an output requested by the driver.

Figure 2:
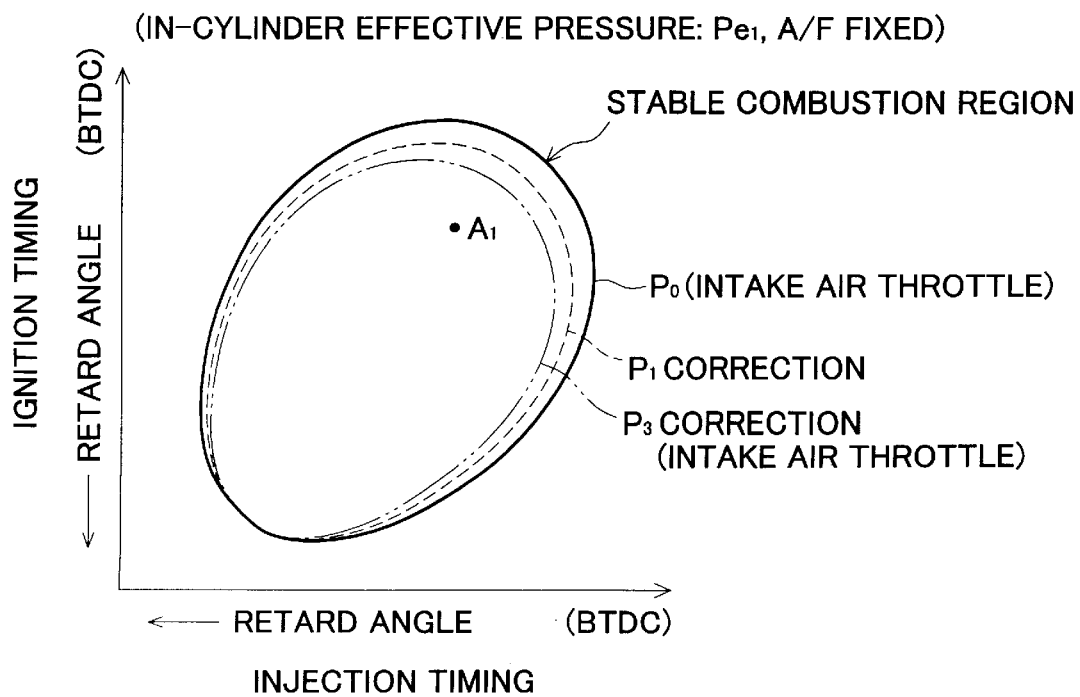
FIG. 2 is a graph showing stable combustion regions obtained under various intake air pressure conditions in the compression-stroke injection mode of the in-cylinder injection spark-ignition internal combustion engine and compared with a in-cylinder effective pressure fixed.

The following is a description of computation of the various engine control parameter values based on the compression-stroke injection mode. First, in Step S32, the fuel injection termination timing Tend and the ignition timing Tig are set in accordance with the target mean effective pressure Pec and the engine speed Ne. Also in this method for setting the fuel injection termination timing Tend and the ignition timing Tig, these values should only be read from the map as in the case of the computation of the target mean effective pressure PeB in Step S12. Since the target mean effective pressure Pec used in setting the fuel injection termination timing Tend and the ignition timing Tig is already subjected to atmospheric correction in Step S24, the map used should only be the one obtained in the standard atmospheric state, and the fuel injection termination timing Tend and the ignition timing Tig need not be read from different maps depending on the intake air density, as described before with reference to FIG. 2. Thus, the control is simplified, and the bench test for matching need not be repeated so frequently.

Then, in Step S34, the target air-fuel ratio AF, EGR amount (opening area Legr of the EGR valve 45), and the opening of the ABV valve 27 are set in accordance with the target mean effective pressure Pe and the engine speed Ne. The target mean effective pressure Pe computed in the aforesaid Step S14 and not subjected to atmospheric correction is used in setting these engine control parameter values. As mentioned before, the engine output cannot be determined uniquely by the intake air volume in the compression-stroke injection mode, and the engine output is obtained substantially in proportion to the quantity of fuel supply. The target mean effective pressure Pe must be subjected to atmospheric correction, since the fuel injection termination timing Tend and the ignition timing Tig must be set at their respective optimal values in order to secure stable stratified-charge combustion. However, the target air-fuel ratio AF, EGR amount, and opening of the ABV valve 27 are control parameters that are associated directly with the engine output, rather than parameters that influence the stratified-charge combustion. In order to realize faithfully the engine output requested by the driver, therefore, the accelerator opening information based on the driver's operation must be accurately reflected in these control parameters. Accordingly, the target mean effective pressure Pe for setting these control parameter values need not be subjected to atmospheric correction, and in this case, atmospheric correction is rather harmful because it inhibits reflection of the driver's intention.

Also in this method for setting the target air-fuel ratio AF, EGR amount, and opening of the ABV valve 27, these values should only be read from the map as in the case of the computation of the target mean effective pressure PeB in Step S12.

When setting of these control parameter values is finished, the program advances to Step S40, whereupon the valve-open time Tinj of the fuel injection valve 4 is computed according to the following expression (M5).

$$Tinj = K \times (Qa \times \gamma / AF) \times (Kwt \times \ldots) \times Kg + T_{DEC}. \quad (M5)$$

Here Kwt, Kaf . . . are various correction factors that are set corresponding to the engine water temperature Tw and the like, and are set in accordance with the engine operating state. Kg is the gain correction factor of the fuel injection valve 4, and $T_{DEC}$ is a downtime correction value, which is set in accordance with the target mean effective pressure Pe and the engine speed Ne. K, which is a constant, is a conversion coefficient for converting the fuel quantity into a valve-open time.

In expression (M5), the term "Qa×γ" represents correction of the intake air volume Qa by the intake air density (environmental parameter value) γ, whereby a more appropriate valve-open time Tinj is obtained.

In Step S42, the fuel injection valve 4 is actuated at a timing settled in accordance with the valve-open time Tinj and the fuel injection termination timing Tend calculated in this manner, and a required quantity of fuel is fed into the combustion chamber 5 by injection. Further, ignition is effected by the spark plug 3 at a timing settled in accordance with the ignition timing Tig, and the EGR valve 45 and the ABV valve 27 are driven to be adjusted to set required openings.

Thus, the optimal fuel injection termination timing Tend and the optimal ignition timing Tig can be obtained with use of the target mean effective pressure Pec subjected to atmospheric correction, and stable stratified-charge combustion can be secured by the optimal fuel injection termination timing Tend and the optimal ignition timing Tig obtained in this manner.

(Setting Procedure of Embodiment 2)

Figure 12:
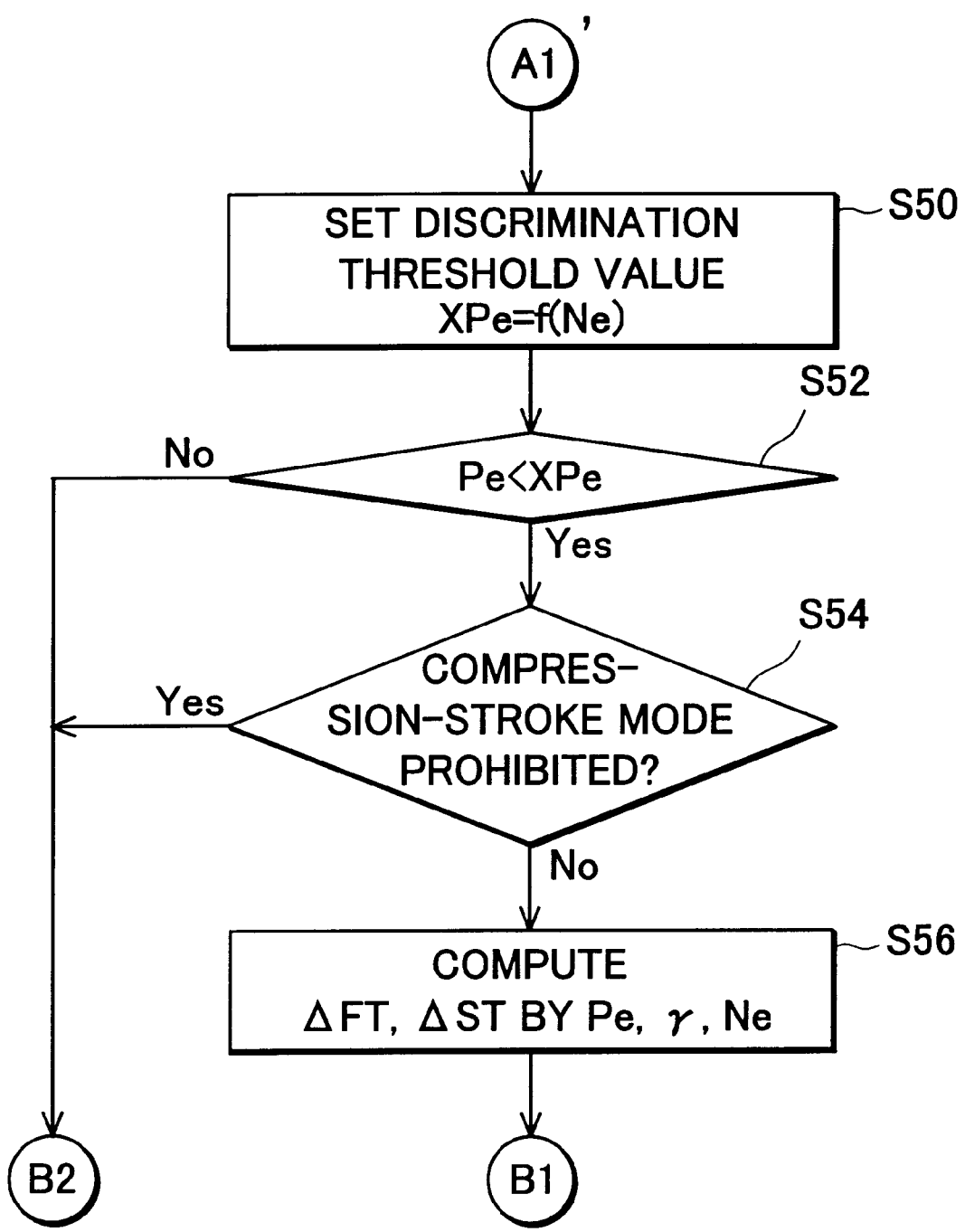
FIG. 12 is a part of a flowchart of a crank interruption routine according to Embodiment 2 of the present invention executed following the flowchart according to Embodiment 1 shown in FIG. 8.
Figure 13:
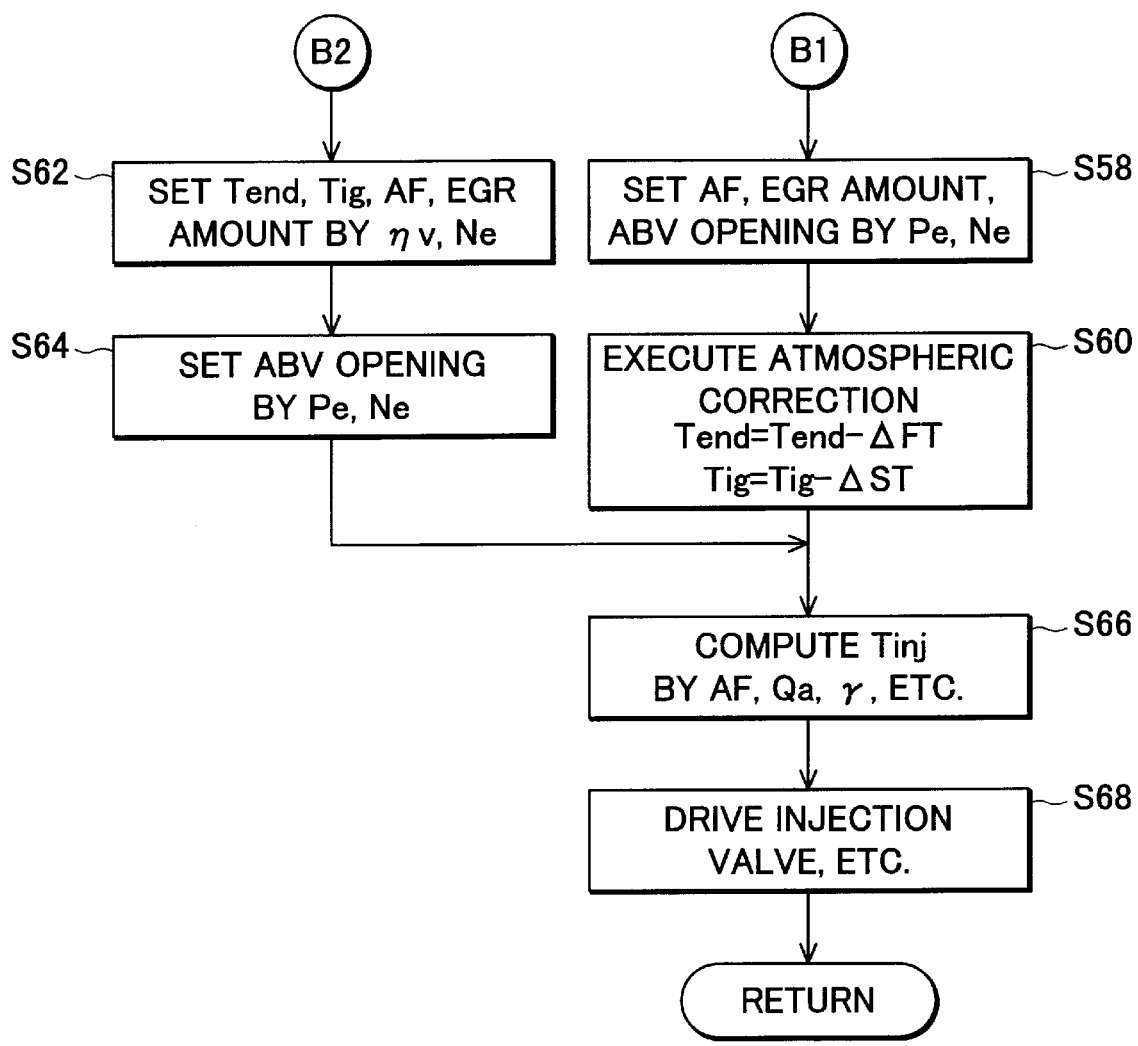
FIG. 13 is the remainder portion of the flowchart of the crank interruption routine according to Embodiment 2 continued from the flowchart of FIG. 12.

Steps of procedure according to Embodiment 2 are shown in the flowcharts of FIGS. 8, 12, and 13. The flowchart of FIG. 8 showing Embodiment 1 can be applied directly to the steps of procedure for various engine control parameter values according to Embodiment 2. Also in Embodiment 2, the target mean effective pressure Pe subjected to accessory correction, volumetric efficiency Ev, intake air density γ, and charging efficiency ηv are computed in Steps S14, S16, S18 and S20, respectively.

Then, the ECU 70 executes Step S50 of FIG. 12, that is, sets the discrimination threshold value XPe for determining the injection mode, the intake-stroke injection mode or the compression-stroke injection mode, in which the engine is to be controlled, in accordance with the engine speed Ne. In Steps S52 and S54, the ECU 70 determines whether or not the engine should be controlled in the compression-stroke injection mode. This discrimination method is identical to the method of Embodiment 1. In the case where the target mean effective pressure Pe is not lower than the discrimination threshold value XPe so that the conclusion in Step S52 is negative (No), or in the case where the operating state is one in which the control based on the compression-stroke injection mode is to be prohibited so that the conclusion in Step S54 is positive (Yes), the program advances to Step S62 of FIG. 13, whereupon computation of the various engine control parameter values based on the intake-stroke injection mode is carried out. In the case where the conclusions in Steps S52 and S54 are positive and negative, respectively, on the other hand, the program advances to Step S56, whereupon computation of the various engine control parameter values based on the compression-stroke injection mode is carried out.

The computation of the various engine control parameter values based on the intake-stroke injection mode according to Embodiment 2 will be described first. In the intake-stroke injection mode, the engine parameter values are computed by the same method as the computation method according to Embodiment 1. Thus, the fuel injection termination timing Tend, ignition timing Tig, target air-fuel ratio AF, and EGR value (opening area Legr of the EGR valve 45) are set in accordance with the charging efficiency ηv and the engine speed Ne in Step S62, and the opening of the ABV valve 27 is set in accordance with the target mean effective pressure Pe and the engine speed Ne. Since these control parameter values are set in the same manner as in Embodiment 1, a description of this setting method is omitted herein.

The following is a description of computation of the various engine control parameter values based on the compression-stroke injection mode. In Step S56, according to Embodiment 2, atmospheric correction values ΔFT and ΔST for the fuel injection termination timing Tend and the ignition timing Tig are computed first. In this case, a three-dimensional map is used for the computation of the atmospheric correction values ΔFT and ΔST, and the atmospheric correction values ΔFT and ΔST are read in accordance with the target mean effective pressure Pe, engine speed Ne, and intake air density γ. As mentioned later, the fuel injection termination timing Tend and the ignition timing Tig are computed in accordance with the target mean effective pressure Pe and the engine speed Ne. Therefore, the aforesaid three-dimensional map is stored with mapped atmospheric correction values ΔFT and ΔST corresponding to the intake air density γ, with respect to the fuel injection termination timing Tend and the ignition timing Tig computed in accordance with the target mean effective pressure Pe and the engine speed Ne.

Then, in Step S58 of FIG. 13, the target air-fuel ratio AF, EGR amount (opening area Legr of the EGR valve 45), and opening of the ABV valve 27 are set in accordance with the target mean effective pressure Pe not subjected to atmospheric correction and the engine speed Ne. At the same time, the fuel injection termination timing Tend and the ignition timing Tig are also set in accordance with the target mean effective pressure Pe not subjected to atmospheric correction and the engine speed Ne. For the fuel injection termination timing Tend and the ignition timing Tig, moreover, atmospheric correction is executed in Step S60.

The following expressions (N1) and (N2) represent atmospheric correction operational expressions for the fuel injection termination timing Tend and the ignition timing Tig, individually. The optimal fuel injection termination timing Tend and the optimal ignition timing Tig corresponding to the intake air density are computed by subjecting the fuel injection termination timing Tend and the ignition timing Tig obtained in Step S58 to retard correction with the atmospheric correction values ΔFT and ΔST obtained in Step S56. Conceptually, optimal fuel injection termination timings Tend and optimal ignition timings Tig corresponding to optimal points A, A1, A2 . . . shown in FIG. 1 are computed according to the intake air density γ.

$$Tend = Tend - \Delta FT, \qquad (N1)$$

$$Tig = Tig - \Delta ST. \qquad (N2)$$

When the optimal fuel injection termination timing Tend, optimal ignition timing Tig, target air-fuel ratio AF, EGR amount (opening area Legr of the EGR valve 45), and opening of the ABV valve 27 are set in this manner, the valve-open time Tinj of the fuel injection valve 4 is computed according to the foregoing expression (M5) in Step S66, as in Embodiment 1. In Step S68, the fuel injection valve 4 is actuated at a timing settled in accordance with the computed valve-open time Tinj and the injection termination timing Tend, and a required quantity of fuel is fed into the combustion chamber 5 by injection. Further, ignition is effected by the spark plug 3 at a timing settled in accordance with the ignition timing Tig, and the EGR valve 45 and the ABV valve 27 are driven to be adjusted to set required openings.

Thus, also in Embodiment 2, stable stratified-charge combustion can be secured by the optimal fuel injection termination timing Tend and the optimal ignition timing Tig that are subjected to atmospheric correction.

The engines described in connection with the foregoing embodiments are of a type that the target air-fuel ratio is set corresponding to the target load and the fuel quantity is calculated from the intake air volume to obtain this target air-fuel ratio. However, flows in the cylinder change depending on the intake air density, so that the optimal injection timing and ignition timing vary depending on the intake air density. Also for engines of a type such that the fuel quantity is obtained directly from the target load, therefore, it is significant to subject the target load to intake air density correction or set correction values for the ignition timing and the injection timing corresponding to the intake air density and to obtain final data for the ignition timing and injection timing in accordance with one or both of these factors. It is to be understood that the present invention is also applicable to the engines of this type.

We claim:

1. A control apparatus for an in-cylinder injection spark-ignition internal combustion engine, which has a fuel injection valve for injecting fuel directly into a combustion chamber, and in which the fuel is injected mainly in a compression stroke, thereby undergoing stratified-charge combustion, when the internal combustion engine is operated in a specified operation region, comprising:

target load setting means for setting a target load value corresponding to accelerator opening information based at least on a driver's operation;

environmental parameter value detecting means for detecting environmental parameter values correlated with an intake air density;

discriminating means for discriminating that the internal combustion engine is being operated in a compression-stroke injection mode based on said set target load value;

target load correcting means for correcting the set target load value based on the detected environmental parameter values when said discriminating means discriminates that the internal combustion engine is being operated in the compression-stroke injection mode;

first control parameter value setting means for setting at least one engine control parameter value including at least one of a fuel injection timing and an ignition timing in accordance with the corrected target load value; and control means for executing said stratified-charge combustion in accordance with the set at least one engine control parameter value.

2. A control apparatus for an in-cylinder injection spark-ignition internal combustion engine according to claim 1, wherein said first control parameter value setting means sets the fuel injection timing and the ignition timing in accordance with the corrected target load value.

3. A control apparatus for an in-cylinder injection spark-ignition internal combustion engine according to claim 2, wherein said first control parameter value setting means sets said fuel injection timing so that the fuel injection timing is retarded as the intake air density lowers.

4. A control apparatus for an in-cylinder injection spark-ignition internal combustion engine according to claim 2, wherein said first control parameter value setting means sets said ignition timing such that the ignition timing is retarded as the intake air density lowers.

5. A control apparatus for an in-cylinder injection spark-ignition internal combustion engine according to claim 1, further comprising:

target air-fuel ratio setting means for setting a target air-fuel ratio in accordance with the target load value set by said target load setting means;

intake air volume detecting means for detecting the volume of intake air sucked into said combustion chamber;

intake air volume correcting means for correcting the intake air volume detected by said intake air volume detecting means based on said detected environmental parameter values; and fuel injection quantity calculating means for calculating a fuel injection quantity in accordance with the target air-fuel ratio set by the target air-fuel ratio setting means and the intake air volume corrected by said intake air volume correcting means.

6. A control apparatus for an in-cylinder injection spark-ignition internal combustion engine according to claim 1, further comprising:

injection mode selecting means for changing the injection mode between the compression-stroke injection mode in which the fuel is injected mainly in said compression stroke, and an intake-stroke injection mode, in which the fuel is injected mainly in an intake stroke;

wherein said injection mode selecting means selects said compression-stroke injection mode and the intake-stroke injection mode in accordance with the target load value set by said target load setting means.

7. A control apparatus for an in-cylinder injection spark-ignition internal combustion engine, which has a fuel injection valve for injecting fuel directly into a combustion chamber, and in which the fuel is injected mainly in a compression stroke, thereby undergoing stratified-charge combustion, when the internal combustion engine is operated in a specified operation region, comprising:

target load setting means for setting a target load value corresponding to accelerator opening information based at least on a driver's operation;

rotational speed detecting means for detecting a rotational speed of said internal combustion engine;

control parameter value setting means for setting an engine control parameter value in accordance with the set target load value and the detected engine rotational speed;

environmental parameter value detecting means for detecting environmental parameter values correlated with an intake air density;

control parameter correcting means for correcting at least one engine control parameter value including at least one of a set fuel injection timing and ignition timing based on the detected environmental parameter values; and control means for executing said stratified-charge combustion in accordance with the corrected set at least one engine control parameter value.

8. A control apparatus for an in-cylinder injection spark-ignition internal combustion engine according to claim 7, wherein said control parameter correcting means corrects the fuel injection timing and the ignition timing with the detected environmental parameter values.

9. A control apparatus for an in-cylinder injection spark-ignition internal combustion engine according to claim 8, wherein said control parameter correcting means sets said fuel injection timing such that the injection timing is retarded as the intake air density lowers.

10. A control apparatus for an in-cylinder injection spark-ignition internal combustion engine according to claim 8, wherein said control parameter correcting means sets said ignition timing such that the ignition timing is retarded as the intake air density lowers.

11. A control apparatus for an in-cylinder injection spark-ignition internal combustion engine according to claim 7, wherein said control parameter value setting means sets a target air-fuel ratio in accordance with the target load value set by said target load setting means, the control apparatus further comprising:

intake air volume detecting means for detecting the volume of intake air sucked into said combustion chamber;

intake air volume correcting means for correcting the intake air volume detected by said intake air volume detecting means based on said detected environmental parameter values; and fuel injection quantity calculating means for calculating a fuel injection quantity in accordance with the target air-fuel ratio set by said control parameter value setting means and the intake air volume corrected by said intake air volume correcting means.

12. A control apparatus for an in-cylinder injection spark-ignition internal combustion engine according to claim 7, further comprising:

injection mode selecting means for changing the injection mode between a compression-stroke injection mode in which the fuel is injected mainly in said compression stroke and an intake-stroke injection mode in which the fuel is injected mainly in an intake stroke;

wherein said injection mode selecting means selects one of said compression-stroke injection mode and the intake-stroke injection mode in accordance with the target load value set by said target load setting means.

13. A method for controlling an in-cylinder injection spark-ignition internal combustion engine having a fuel injection valve for injecting fuel directly into a combustion chamber, the fuel being injected mainly in a compression stroke for a stratified-charge combustion when the internal combustion engine is operating in a specified region, comprising:

setting a target load value corresponding to accelerator opening information based at least on a driver's operation;

detecting at least one environmental parameter value correlated with an intake air density;

discriminating that the internal combustion engine is being operated in a compression-stroke injection mode based on said set target load value;

correcting the set target load value based on the detected at least one environmental parameter value when said discriminating step discriminates that the internal combustion engine is being operated in a compression-stroke injection mode;

setting at least one engine control parameter value including at least one of a fuel injection timing and an ignition timing in accordance with the corrected target load value; and executing the stratified-charge combustion in accordance with the set at least one engine control parameter value.

14. A method for controlling an in-cylinder injection spark-ignition internal combustion engine having a fuel injection valve for injecting fuel directly into a combustion chamber, the fuel being injected mainly in a compression stroke for a stratified-charge combustion when the internal combustion engine is operating in a specified region, comprising:

setting a target load value corresponding to accelerator opening information based at least on a driver's operation;

detecting a rotational speed of the internal combustion engine;

setting an engine control parameter value in accordance with the set target load value and the detected engine rotation speed;

detecting at least one environmental parameter value correlated with an intake air density;

correcting at least one engine control parameter value including at least one of a fuel injection timing and an ignition timing based on the detected at least one environmental parameter value; and executing the stratified-charge combustion in accordance with the corrected set at least one engine control parameter value.

* * * * *